United States Patent [19]

Peters

[11] 4,207,924
[45] Jun. 17, 1980

[54] CONTROL VALVE FOR FLUID ACTUATOR

[75] Inventor: Clifford M. Peters, Longview, Tex.

[73] Assignee: W-K-M Wellhead Systems, Inc., Shreveport, La.

[21] Appl. No.: 959,812

[22] Filed: Nov. 13, 1978

[51] Int. Cl.$^2$ .................. F15B 13/042; F16K 31/122
[52] U.S. Cl. .............................. 137/625.66; 137/458
[58] Field of Search ........................... 137/458, 625.66

[56] References Cited

U.S. PATENT DOCUMENTS

| 3,875,965 | 4/1975 | Peters .......................... 137/625.66 X |
| 3,877,484 | 4/1975 | Theriot et al. ................. 137/625.66 |
| 3,921,660 | 11/1975 | Kowalski ..................... 137/625.66 X |
| 3,943,974 | 3/1976 | Connelly et al. ............ 137/625.66 X |

*Primary Examiner*—Gerald A. Michalsky
*Attorney, Agent, or Firm*—Eugene N. Riddle

[57] ABSTRACT

A control valve for a fluid actuator has a slide valve member mounted within a housing or body with an external knob on one end and a piston on the other end. The body has a central bore with an enlarged bore portion forming a valve chamber in which the piston is mounted for reciprocation. The chamber adjacent one piston face forms a fluid storage chamber and the chamber adjacent the other piston face forms a fluid pressure chamber to receive pressurized fluid. A one-way check valve is positioned between the two chambers and permits fluid pressure in the fluid storage chamber to be equalized with the fluid pressure in the pressure chamber. Upon a subsequent exhaust of fluid from the fluid pressure chamber, the piston will move quickly to a seated position under the fluid pressure in the storage chamber without any separate urging means, such as a spring, being necessary.

6 Claims, 5 Drawing Figures

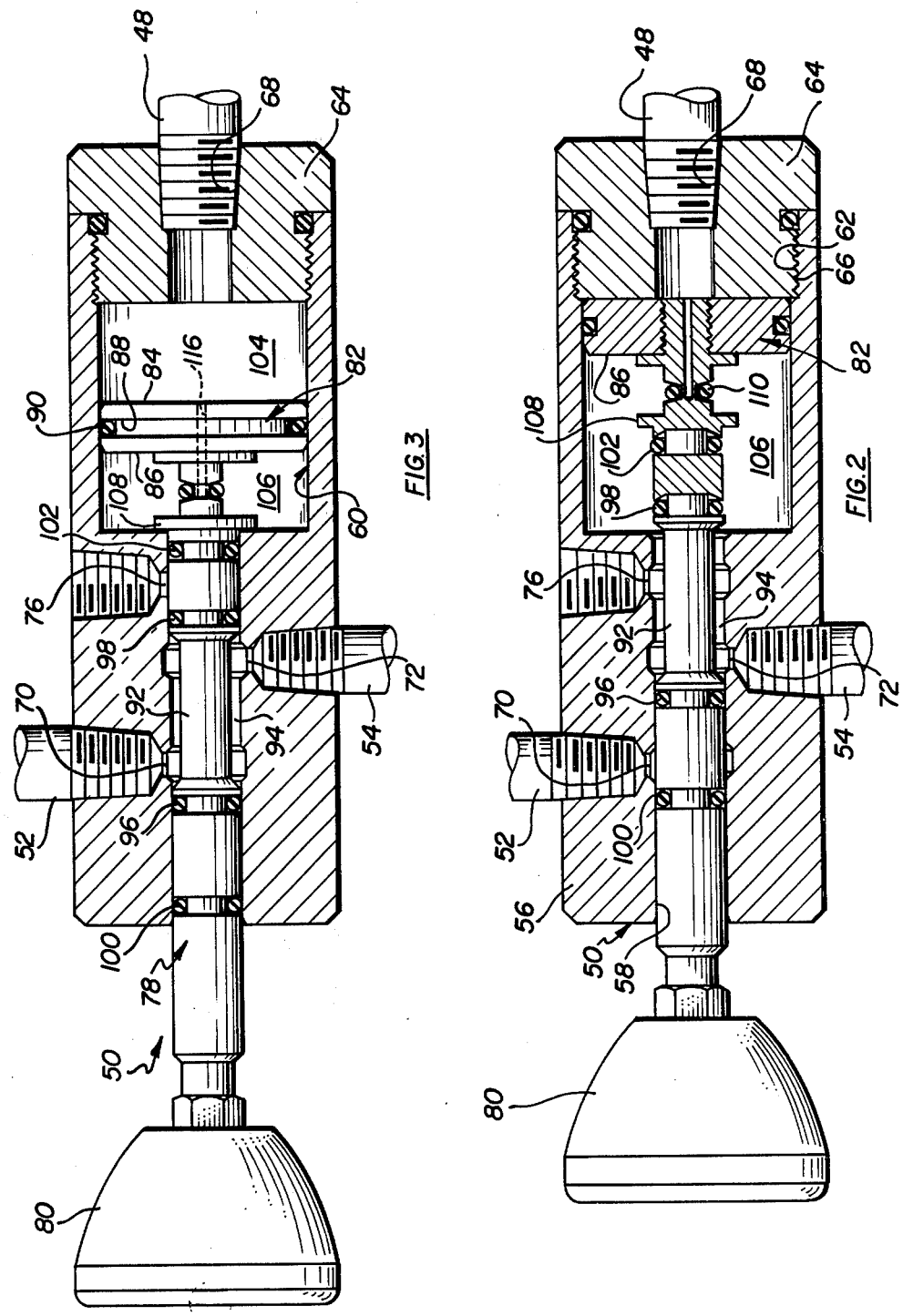

CONTROL VALVE FOR FLUID ACTUATOR

BACKGROUND OF THE INVENTION

Heretofore, such as shown in U.S. Pat. No. 3,943,974 dated Mar. 16, 1976, a control valve for a fluid actuator has a slide valve member mounted within a housing with a piston on one end and a knob on the other end. A spring is provided to urge the slide valve and piston to a seated position so that upon an exhausting of fluid from the piston chamber the piston will move rapidly to a seated position thereby to permit the subsequent exhaust of fluid from the actuator for closing of the associated valve. In the event of a failure of the spring, it is possible that the piston would not move to the seated position which would thereby prevent the valve in the main flowline from moving to a closed position. As shown in U.S. Pat. No. 3,877,484 dated Apr. 15, 1975, a differential area on the valve member is provided to effect movement of the piston upon an exhaust fluid from the pressurized piston chamber.

DESCRIPTION OF THE PRESENT INVENTION

The present invention is directed to a control valve for a fluid actuator in which a spring or other urging means is not required in order to move the piston to a seated position upon the exhausting of fluid from the piston chamber. The control valve includes a slide valve member having a piston on one end mounted in an enlarged bore portion for movement between seated and unseated positions. In the unseated position of the piston, fluid is supplied to the actuator to hold the associated gate valve in an open position. The piston has a chamber adjacent each face thereof. The chamber adjacent one piston face forms a fluid storage or compression chamber while the chamber adjacent the other piston face forms a fluid pressure chamber to receive pressurized fluid from an inlet port. A one-way check valve is positioned between the two chambers and permits fluid pressure from the fluid pressure chamber to be equalized in the fluid storage chamber. Upon a buildup of pressurized fluid in the fluid pressure chamber, the check valve permits the flow of fluid from the fluid pressure chamber to the storage chamber.

An inlet port is in fluid communication with the fluid pressure chamber and a fluid line from the high and low pressure pilot valves extends to the inlet port. A pilot line pressure of around thirty-five (35) psi or in a range between around thirty (30) and fifty (50) psi is provided. Thus, the storage chamber will have the same fluid pressure as the fluid pressure chamber and a pressure of around thirty-five (35) psi will be provided in the storage chamber. Therefore, upon a subsequent exhaust of fluid from the fluid pressure chamber after a high or low sensing pilot is fired, the piston will move rapidly to a seated position under the fluid pressure in the storage chamber without any separate urging means, such as a spring, being necessary. A differential pressure area is not required in order to effect movement of the piston as the pressure differential between the storage chamber and the pressure chamber upon exhaust of the pressure chamber is substantial.

DESCRIPTION OF DRAWINGS

FIG. 2 is an enlarged sectional view of the control valve shown in the system of FIG. 1 and comprising the present invention with the piston being shown in a seated position in which fluid from the actuator is exhausted;

FIG. 3 is a sectional view similar to FIG. 2 but showing the piston in an unseated operable position with fluid being supplied to the actuator;

Figure 1:
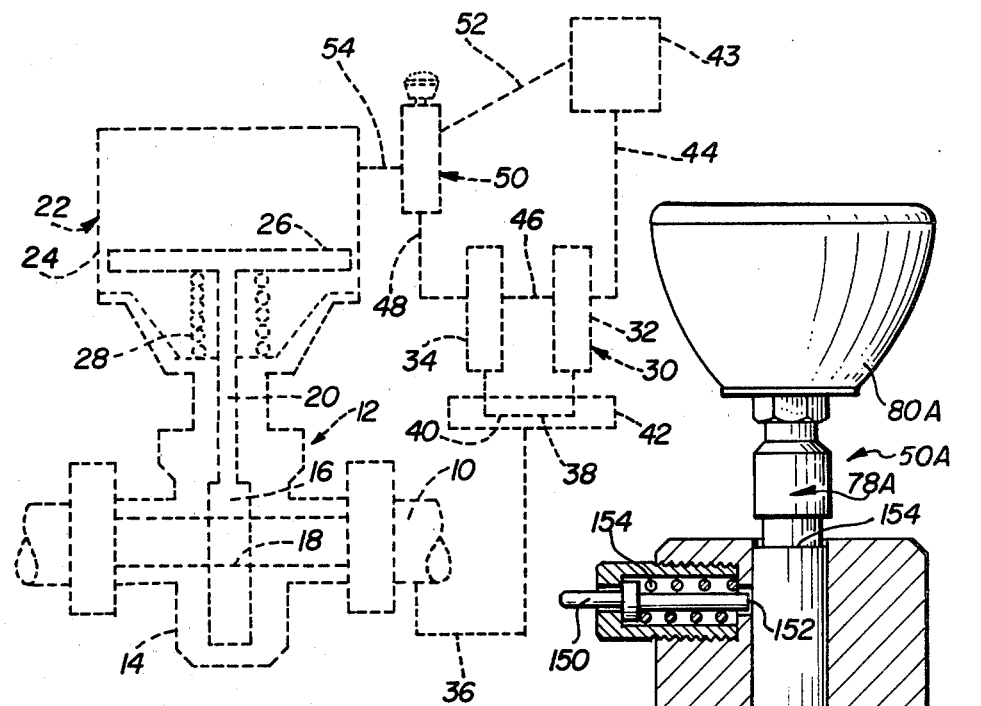
FIG. 1 is a schematic view showing the system in which the control valve or the present invention is employed with a fluid actuator and a gate valve across a main flowline.

Referring now to the drawings for a better understanding of this invention, and more particularly to FIG. 1, a main flowline indicated at 10 has a gate valve structure generally indicated at 12 therein. Gate valve body 14 has a slab gate 16 mounted therein with an opening 18 in slab gate 16 movable between open and closed positions relative to flowline 10. A stem indicated at 20 is connected to slab gate 16 and extends upwardly through a pneumatic actuator indicated generally at 22. Pneumatic actuator 22 includes a cylinder 24 having a piston 26 mounted therein and secured to stem 20 for reciprocal movement within cylinder 24. A spring 28 mounted within cylinder 24 continuously urges piston 26 and gate valve member 16 to a closed position.

A high-low pilot structure is generally indicated at 30 and includes a high pressure pilot 32 and a low pressure pilot 34. Pressure in flowline 10 is sensed through pilot line 36, through branch line 38 to high pressure pilot 32 and through branch line 40 to low pressure pilot 34. Pilots 32 and 34 are supported on a base 42. Each pilot 32, 34 has a shiftable valve member therein and a spring urging the valve member in one direction. A fluid source 43, such as a pressurized cylinder of oxygen or nitrogen gas, is connected by line 44 to high pressure pilot 32, thence by a connecting line 46 to low pressure pilot 34, and by line 48 to the control valve structure 50 forming the present invention. High pressure pilot 32 may be set to be actuated at a predetermined high pressure in flowline 10 and low pressure pilot 34 may be set to be actuated at a predetermined low pressure in flowline 10. Thus, an operating fluid pressure range is provided between the low pressure at which low pressure pilot 34 is set and the high pressure at which high pressure pilot 32 is set. In the event the fluid pressure in flowline 10 reaches a pressure lower than the pressure at which low pressure pilot 34 is set the pressurized gas within line 46 to low pressure pilot valve 34 is interrupted and line 48 is exhausted to atmosphere.

Likewise, when a predetermined high pressure is reached outside the operating range at which high pressure pilot 32 is set, fluid in line 44 supplied to high pressure valve 32 is interrupted and lines 46 and 48 are exhausted to atmosphere. For futher details of the operation of pilot valve structure 30, reference is made to the prior U.S. Pat. No. 3,043,331 issued July 10, 1962.

Fluid, preferably pressurized gas, is supplied from source 43 through line 52 to control valve 50 and thence through line 54 to actuator 22. The pressurized gas is supplied continuously to actuator 22 as long as lines 52 and 54 are in fluid communication with each other through control valve 50 and piston 26 remains in the position shown in FIG. 1 in which slab gate 16 is in an open position. When the flow of fluid is interrupted by control valve 50 to line 54, the fluid is exhausted from line 54 and actuator 22 through control valve 50. Upon the exhaust of fluid from actuator 22 piston 26 moves to its up position under the bias of spring 28 and slab gate 16 moves to a closed position to shut off fluid flow through flowline 10.

Figure 4:
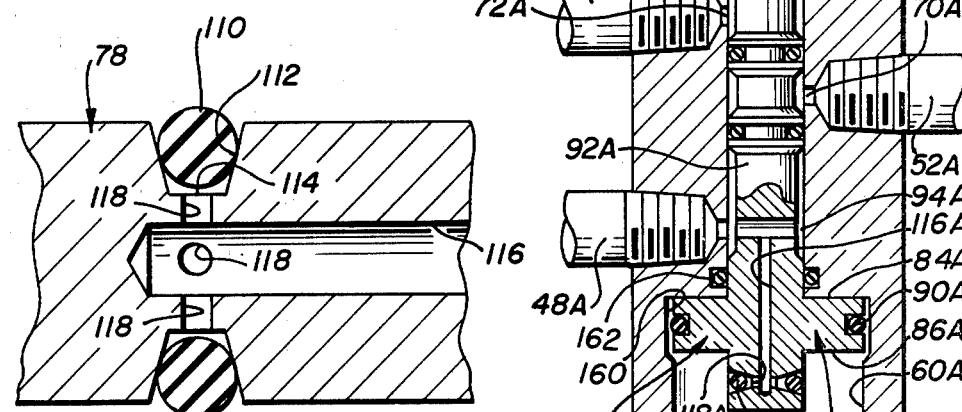
FIG. 4 is an enlarged section showing an O-ring positioned in a groove of the valve stem adjacent the piston to provide a one-way check valve between opposite sides of the piston.

Referring now more particularly to FIGS. 2-4 in which a so-called pull type control valve 50 comprising the present invention is shown in detail, a cylindrical housing 56 forming the main body is provided and has a longitudinal bore therethrough comprising a reduced diameter bore portion 58 and an enlarged diameter bore portion 60. The lower end of housing 56 has internal screw threads 62 and an externally threaded end plug 64 has external screw threads 66 which engage internal threads 62. A central bore 68 is provided in end plug 64 and line 48 is threaded within bore 68. Housing 56 has an inlet port 70 in which line 52 is threaded. Inlet port 70 communicates with bore portion 58 and provides pressurized gas thereto. An outlet port 72 is formed in housing 56 and line 54 is connected thereto to supply pressurized gas to actuator 22. A vent port 76 is in fluid communication with bore portion 58. When outlet 54 is in communication with vent 76 as shown in FIG. 2, actuator 22 is vented to atmosphere.

A slide valve is generally indicated at 78 and has a knob 80 adjacent an outer end thereof which may be manually gripped for actuating slide valve 78 as will be explained. A piston generally indicated at 82 is secured adjacent the inner end of slide valve 78. Enlarged bore portion 60 forms a valve chamber or cylinder in which piston 82 is mounted for sliding movement. Piston 82 has an outer face 84, an inner face 86, and an annular groove 88 in which an O-ring 90 is mounted to provide sealing contact with the adjacent wall defining enlarged bore portion 60. Slide valve 78 has a reduced diameter portion 92 positioned adjacent outlet port 72 and the annular space 94 adjacent reduced diameter portion 92 is in fluid communication with outlet port 72 at all times. Inner seals 96 and 98 are provided in grooves on opposed ends of reduced diameter portion 92. Inner seal 96 moves across inlet port 70 when it moves from the position of FIG. 3 to the position of FIG. 2. Inner seal 98 moves across vent port 76 when it moves from the position of FIG. 2 to the position of FIG. 3. In the position of FIG. 3 in which piston 82 is in a raised operable position, fluid from actuator 22 is blocked from vent port 76. In the position of FIG. 2 in which piston 82 is seated, fluid from actuator 22 is in fluid communication with vent port 76 thereby to vent the actuator. An upper O-ring seal 100 about slide valve 78 provides a seal adjacent the upper end of slide valve 78. A lower O-ring 102 is mounted in a groove in slide valve 78.

Enlarged bore portion 60 forms a fluid pressure chamber 104 on one side of piston 82 adjacent face 84, and a second storage or compressed air chamber 106 is exposed to face 86 on the other side of piston 82. An annular flange 108 extends about slide valve 78 and abuts the inner end of enlarged bore portion 60 when slide valve 78 is pulled upwardly as shown in the position of FIG. 3 to limit the movement of slide valve 78 in an upward position. As shown in FIG. 4, a one-way check or relief valve is shown comprising O-ring 110 which is mounted in a tapered groove 112 having a bottom 114 thereof. O-ring 110 is not fully seated against bottom 114 as shown in FIG. 4 but fits tightly against the adjacent surfaces defining tapered groove 112. Piston 82 has a longitudinal opening 116 therethrough and a plurality of laterally extending fluid passageway or ports 118 extending outwardly from opening 116 in fluid communication with tapered groove 112. In the position of slide valve 78 shown in FIG. 2, storage chamber 106 is in fluid communication with vent port 76. However, upon an upward movement of slide valve 78 from the position of FIG. 2, O-ring seal 98 engages the adjacent surface defining small diameter bore 58 and blocks fluid communication between vent port 76 and storage chamber 106.

FIG. 2 shows the position of slide valve 78 after the firing of either the high pressure pilot 32 or the low pressure pilot 34 which results in the exhaust of fluid from line 48 and fluid pressure chamber 104. Upon seating of piston 82, line 54 to actuator 22 is in fluid communication with vent port 76 thereby to exhaust the fluid from pneumatic actuator 22 whereby piston 26 moves gate valve 16 to closed position thereof under the urging of spring 28. To reset slide valve 78, knob 80 is pulled upwardly and the pilot line pressure through line 48 in communication with fluid pressure chamber 104 increases to a pressure of around 35 psi. Until the pressure builds up in piston chamber 104 after the movement of slide valve 78 to the position of FIG. 3, the friction resulting from O-rings 96, 98, 100, and 102 against the bore surfaces resists any movement of slide valve 78 to a seated position of FIG. 2 and slide valve 78 will remain in its upward position FIG. 3 when knob 80 is pulled upwardly. Flange 108 limits any compression of gas in storage chamber 106 and when the pressure in fluid pressure chamber 104 reaches the pilot line pressure of thirty-five (35) psi, for example, the pressure in storage chamber 106 likewise has reached a pressure of around thirty-five (35) psi through one-way check valve 110 and slide valve 78 is in a set operable position. In this position, fluid from supply line 52 is provided through line 54 to actuator 22 to move gate valve 16 to the open position as shown in FIG. 1. Upon the reaching of a predetermined high or low fluid pressure in main flowline 10, either high pressure pilot 32 or low pressure pilot 34 will be actuated to vent the pilot fluid to atmosphere. Upon venting to atmosphere, line 48 and fluid pressure chamber 104 are exhausted to atmosphere. However, storage chamber 106 remains under the pilot line pressure of thirty-five (35) psi, for example, since O-ring check valve 110 prevents the fluid pressure from escaping. This pressure acts against face 86 of piston 82 and rapidly moves piston 82 to the seated position thereof shown in FIG. 2. Upon the passage of O-ring 98 past vent port 76, line 54 is vented to atmosphere through vent port 76. The fluid pressure in chamber 106 is vented to atmosphere through port 76 when O-ring 98 enters chamber 106. Thus, piston 82 is seated without the use of any separated spring or any differential area being required to move piston 82 to the seated position thereof shown in FIG. 2.

Figure 5:
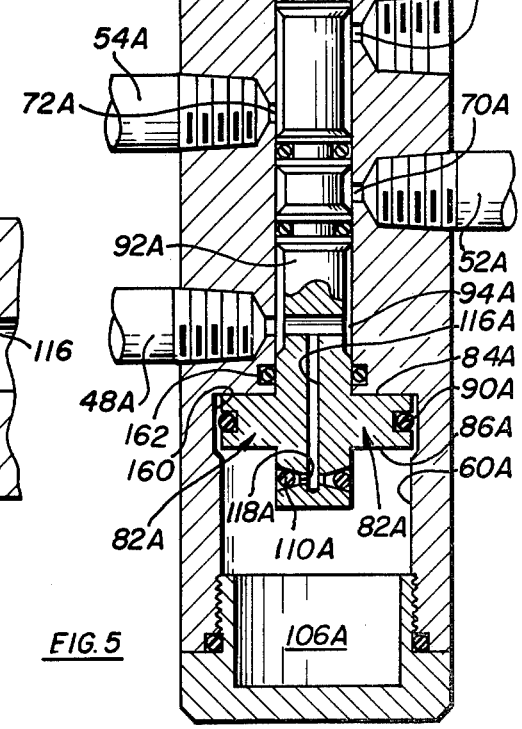
FIG. 5 is a sectional view of a modified control valve illustrating a push-type slide valve member.

Referring to FIG. 5, a modified control valve 60A is illustrated which is of a so-called push-type instead of the pull-type control valve shown in FIGS. 2-4. Control valve 60A has a knob 80A and a slide valve 78A. A vent port is illustrated at 76A and an inlet port 70A is connected to inlet line 52A. Outlet port 72A is connected to outlet line 54A leading to the actuator. Inner face 84A of piston 82A is exposed to pilot line pressure from line 48A. The outer face 86A is exposed to the storage chamber 106A while the fluid pressure chamberr is formed adjacent inner face 84A. A detent 150 having an inner end 152 is adapted to be received within groove 154. To set control valve 60A, knob 80A and slide valve 78A are pushed inwardly and piston O-ring 90A engages the adjacent surface of enlarged bore 60A. Upon a build-up of pressurized fluid in line 48A, fluid pressure through passage 116A and ports 118A is transmitted to storage chamber 106A through O-ring 110A forming the one-way check valve. Detent 152 engages the lower surface defining groove 154 upon upward urging from an initial compression of fluid in chamber 106A prior to the increase of pressure from line 48A. However upon a build-up pressure in line 48A, piston 82A is urged slightly downwardly to result in detent 150 being urged outwardly under the influence of spring 154 thereby setting slide valve 78A for operation. Upon the exhausting of fluid from line 48A, the fluid in chamber 106A quickly urges piston 82A to a seated position thereof shown in FIG. 5 thereby to exhaust fluid from line 54A through vent port 76A.

Slide valve 78A has a reduced diameter portion 92A which defines an annular chamber 94A with the adjacent bore surface. The enlarged bore portion 60A has an expanded diameter section 160 which is spaced from O-ring 90A in the seated position of piston 82A. Upon the movement of piston 82A from its seated position and prior to O-ring 90A engaging the reduced diameter section of bore portion 60A, annular chamber 94A passes O-ring 162 to permit the venting of chamber 106A through line 48A. Line 48A upon the initial movement of piston 82A from seated position is at atmosphere or very low pressure and permits the venting of chamber 106A as piston 82A is moved to its unseated position.

What is claimed is:

1. A control valve comprising:
   a valve body, an elongated bore within said body including an enlarged diameter fore portion defining a piston chamber, an elongated valve member slidably mounted within the bore having a knob on an outer end thereof and a piston on an inner end thereof within the piston chamber, said piston having an inner face adjacent said knob and an outer face remote from said knob;
   said body having a first fluid inlet port, an outlet port, a bleed port, and a second fluid inlet port; said piston having one face thereof exposed to said second fluid inlet port and being selectively shiftable between an unseated first position of the piston allowing fluid communication between the first fluid inlet port and the outlet port and precluding communication between the outlet port and the bleed port, and a seated second position of the piston allowing fluid communication between said outlet port and said bleed port and precluding communication between said first fluid inlet port and said outlet port;
   said piston chamber including a pressure chamber portion in fluid communication with said second fluid inlet port adjacent said one face of the piston and a fluid storage chamber portion adjacent the other face of the piston, and a one-way check valve carried by the valve member permitting fluid flow from the pressure chamber portion to the storage chamber portion for equalizing the pressure therebetween in the unseated first position of the piston, said storage chamber when said pressure chamber portion is pressurized from said second fluid inlet port being pressurized through said one-way check valve whereby upon the exhausting of fluid from the pressure chamber portion the pressurized fluid in said storage chamber portion quickly moves said piston to said seated second position.

2. A control valve as set forth in claim 1 wherein said valve mamber is pushed inwardly of the body to the unseated first position and said pressure chamber portion is positioned adjacent the inner face of the piston.

3. A control valve as set forth in claim 1 wherein said valve member is pulled outwardly of the body to the unseated first position and said pressure chamber portion is positioned adjacent the outer face of the piston.

4. A control valve for a valve actuator comprising:
   an elongated valve body, an elongated bore within said body having an enlarged diameter bore portion defining a piston chamber, an elongated valve member slidably mounted within the bore having a knob on an outer end thereof outwardly of the body and a piston adjacent an inner end thereof within the piston chamber;
   said valve body having in fluid communication with the bore a first fluid inlet port, an outlet port, a bleed port, and a second fluid inlet port; said outlet port being in fluid communication with the actuator and said first inlet port being in fluid communication with a source of pressurized fluid;
   said piston having one face thereof exposed to said second fluid inlet port, said valve member and piston being selectively shiftable between an unseated first position of the piston allowing fluid communication between the first fluid inlet port and the outlet port and precluding communication between the outlet port and the bleed port, and a seated second position of the piston allowing fluid communication between said outlet port and said bleed port and precluding communication between said first fluid inlet port and said outlet port;
   said poiston chamber including a pressure chamber portion in fluid communication with said second fluid inlet port adjacent said one face of the piston and a fluid storage chamber portion adjacent the other face of the piston, a fluid passage in the valve member between the pressure chamber portion and the fluid storage chamber portion, a one-way check valve in the fluid passage permitting fluid flow from the pressure chamber portion to the storage chamber portion for equalizing the pressure therebetween in the unseated first position of the piston;
   a seal between the valve member and the body adjacent the storage chamber portion at the unseated first position of the piston to permit pressurization of the storage chamber portion, said storage chamber portion when said pressure chamber portion is pressurized from said second fluid inlet port in the unseated first position of the piston being pressurized through said one-way check valve whereby upon the exhausting of fluid from the pressure chamber portion the pressurized fluid in said storage chamber portion quickly moves said piston to said seated second position, and vent means to vent said storage chamber portion when the piston is out of said unseated first position.

5. A control valve as set forth in claim 4 wherein said vent means is operable to vent said storage chamber portion when said piston is in said seated second position.

6. A control valve as set forth in claim 4 wherein said one-way check valve comprises a stretchable O-ring about the valve in said fluid passage to permit fluid flow into said storage chamber portion.

* * * * *

UNITED STATES PATENT AND TRADEMARK OFFICE
CERTIFICATE OF CORRECTION

PATENT NO. : 4,207,924
DATED : June 17, 1980
INVENTOR(S) : Clifford M. Peters

It is certified that error appears in the above-identified patent and that said Letters Patent are hereby corrected as shown below:

Column 5, line 37, change "fore" to -- bore --.

Column 6, line 5, change "mamber" to -- member --;

line 37, change "poiston" to -- piston --.

Signed and Sealed this

Fifth Day of May 1981

[SEAL]

Attest:

RENE D. TEGTMEYER

Attesting Officer     Acting Commissioner of Patents and Trademark